US005574613A

United States Patent [19]

Shirakawa et al.

[11] Patent Number: 5,574,613

[45] Date of Patent: Nov. 12, 1996

[54] LIGHTNING ARRESTER HAVING MACHINERY BUILT-IN

[75] Inventors: Shingo Shirakawa; Morio Ito, both of Hitachi; Shingo Uchida, Noda; Kazutoshi Mochizuki, Utsunomiya, all of Japan

[73] Assignee: Hitachi, Ltd., Tokyo, Japan

[21] Appl. No.: 500,207

[22] Filed: Jul. 10, 1995

[30] Foreign Application Priority Data

Jul. 11, 1994 [JP] Japan .................................... 6-158781

[51] Int. Cl.[6] ........................................ H02H 3/00

[52] U.S. Cl. ........................... 361/117; 361/91; 361/111; 361/127

[58] Field of Search ............................ 361/56, 91, 111, 361/118, 127, 117, 690, 699, 692

[56] References Cited

U.S. PATENT DOCUMENTS 4,262,319 4/1981 Perry et al. ............................ 361/127

FOREIGN PATENT DOCUMENTS 4-66362 10/1992 Japan .............................. H01C 7/12

*Primary Examiner*—Jeffrey A. Gaffin
*Assistant Examiner*—Stephen W. Jackson
*Attorney, Agent, or Firm*—Fay, Sharpe, Beall, Fagan, Minnich & McKee

[57] ABSTRACT

It is an object to provide a lightning arrester having machinery built-in in which an axial length of an insulating tube which stores therein zinc oxide elements is reduced so that an attempt is made for miniaturization. The arrangement is as follows. That is, a metal cap with an inclination portion 11 which is fixed to one end of the insulating tube 4 which stores therein the zinc oxide elements 5 is made to a dish shape which projects toward the anti-side of the zinc oxide elements, openings 11*a* are formed in the inclined portion thereof so that the inside and the outside of the insulating tube 4 communicate with each other, an insulating medium is circulated through the openings 11*a* while a sufficient gap L is formed between the one end of the insulating container 4 and a ground bracket 15, and the zinc oxide elements 5 are cooled by the insulating medium.

6 Claims, 4 Drawing Sheets

LIGHTNING ARRESTER HAVING MACHINERY BUILT-IN

DETAILED DESCRIPTION OF THE INVENTION

1. Industrial Field

The present invention relates to a lightning arrester having machinery built-in in which zinc oxide elements are arranged within a distribution equipment which is filled with an insulating medium.

2. Prior Art

Generally, an outdoor lightning arrester for air distribution which is installed on an electric-light pole has failure such as cracks of insulator tubes or the like because of breakage of lead wires thereof and carelessness upon mounting. Accordingly, in recent years, in order to solve this problem, a lightning arrester having machinery built-in has been proposed in which zinc oxide elements are arranged within a distribution equipment such as, for example, a transformer tank or the like. As such lightning arrester having machinery built-in, the arrangement is known which is described in Japanese Patent Publication No. 4-66362 or the like. This is shown in FIG. 6. This invention is arranged as follows. That is, a line-side terminal 1 is mounted on axial one end of a tubular insulating tube 4 in which zinc oxide elements 5 are arranged therewithin, and a plate-like ground-side terminal 17 is mounted on the other end thereof. A spring 2 is arranged which gives contact pressure between an end plate 18 which is arranged on an inner surface of the insulating tube 4 on the side of the line-side terminal 1, and an opposed part of the zinc oxide elements 5. Meanwhile, a metal spacer 16 is arranged between the ground-side terminal 17 and an opposed part of the insulating tube 4. The lightning arrester of machinery built-in arranged in this manner is arranged within a power distribution equipment such as, for example, a transformer tank or the like and is used. However, the arrangement has been such that, in order to cool the zinc oxide elements 5, openings 4*a* and 17*a* are formed respectively in the insulating tube 4 and the ground-side terminal 17, and convection of the insulating medium such as insulating oil or the like which is filled within the distribution equipment is utilized to recirculate the same between these openings 4*a* and 17*a*.

PROBLEMS TO BE SOLVED BY THE INVENTION

However, the conventional lightning arrester having machinery built-in is merely arranged only such that the opening 17*a* is formed in the plate-like ground-side terminal 17. Accordingly, in order to give a cooling action to the entirety of outer peripheries of the zinc oxide elements 5 by the insulating medium which flows into the lightning arrester from the opening, the conventional lightning arrester has had to be arranged such that the metal spacer 16 is arranged between the side of the ground-side terminal 17 and the opposed part of the insulating tube 4, and a space to a some degree is formed in the vicinity of this metal spacer 16. For this reason, an axial length of the insulating tube 4 must be larger than an axial length of the zinc oxide elements 5. The lightning arrester having machinery built-in is large-sized. As a result, a container for the distribution equipment such as the transformer tank or the like has had to be large-sized.

An object of the invention is to provide a lightning arrester having machinery built-in in which an axial length of an insulating tube which stores therein zinc oxide elements is reduced to make an attempt to miniaturize the same.

MEANS FOR SOLVING THE PROBLEMS

In order to achieve the above-described object, the present invention provides a lightning arrester having machinery built-in in which a line-side terminal is provided on an axial one end of an insulating tube which stores therein zinc oxide elements, a ground mounting bracket is fixed to the axial other end of said insulating tube, openings which communicate with each other through a gap between outer peripheries of said zinc oxide elements and an inner wall surface of said insulating tube are formed respectively on the side of said line-side terminal and on the side of said ground mounting bracket in said insulating tube, and said ground mounting bracket is fixed to a ground bracket within a distribution equipment which is filled with an insulating medium, characterized in that a metal cap with an inclination portion which projects toward the anti-side of the zinc oxide elements and in which said ground mounting bracket is fixed substantially to a center thereof is provided on said axial other end of said insulating tube, and said openings on the side of said ground mounting bracket is formed in the metal cap with the inclination portion.

FUNCTION

The lightning arrester having machinery built-in according to the present invention is arranged such that the metal cap with the inclination portion having the openings is provided, as described above. Accordingly, it is possible to secure a sufficient distribution area for the insulating medium, between the insulating tube and the ground bracket within the distribution equipment without increasing an axial length of the insulating tube. Further, the insulating medium is recirculated efficiently without having that the metal spacer within the insulating tube in order for distribution of the insulating medium, as is in the prior art. Thus, cooling advantages of the zinc oxide element increase, and it is possible to increase a surge absorption capacity and an electromechanical service-life characteristic of the zinc oxide elements.

BRIEF DESCRIPTION OF THE DRAWINGS

FIG. 6 is a transverse cross-sectional view of a conventional lightning arrester having machinery built-in.

EMBODIMENT

Embodiments of the present invention will hereunder be described with reference to the drawings.

Figure 1:
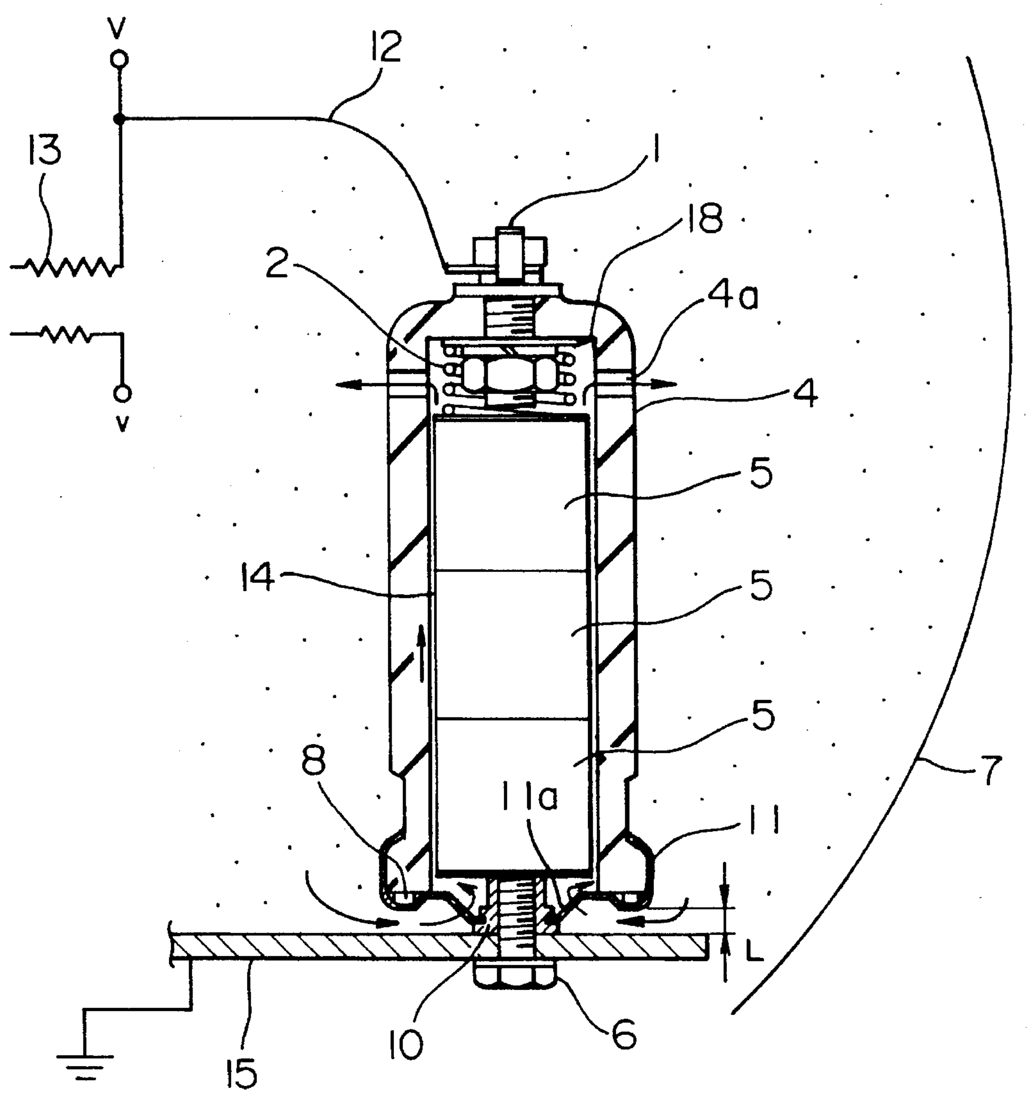
FIG. 1 is a transverse cross-sectional view of a lightning arrester having machinery built-in according to an embodiment of the present invention and an equipment which installs therein the lightning arrester.

FIG. 1 is a transverse cross-sectional view of a lightning arrester having machinery built-in according to an embodiment of the invention.

Figure 2:
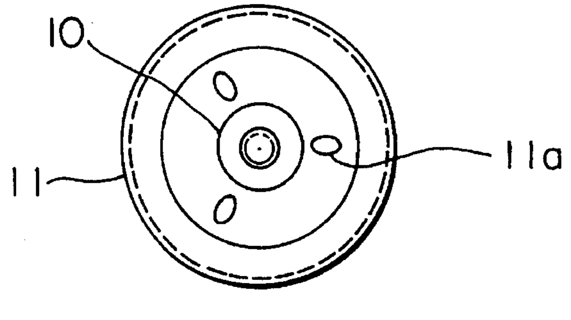
FIG. 2 is a bottom plan view of the lightning arrester having machinery built-in shown in FIG. 1.

A plurality of zinc oxide elements 5 which are laminated axially one upon the other are arranged within a tubular insulating tube 4. A line-side terminal 1 is mounted on axial one end of the insulating tube 4. A dish-like metal cap with an inclination portion 11 is mounted on the axial other end of the insulating tube 4. A ground mounting bracket 10 is fixed at a center of the metal cap 11. A spring 2 for giving contact pressure is arranged between an end plate 18 which is arranged on an inner surface of the insulating tube 4 on the side of the line-side terminal 1, and an opposed part of the zinc oxide elements 5. The other end of the zinc oxide elements 5 is in contact with an inside end of the ground mounting bracket 10 which is fixed at the center of the ground-side terminal with inclination 11. Thus, the contact pressure is given to the zinc oxide elements 5 so that the zinc oxide elements 5 are electrically connected in series between the line-side terminal 1 and the ground mounting bracket 10. The ground mounting bracket 10 is hollow, and is formed at an inner wall of a hollow part thereof with a threaded part with which a bolt 6 engages. Further, the ground mounting bracket 10 is connected to the metal cap 11 at an outer periphery in the middle of an axial direction thereof. This connection is normally practiced by welding, screwing, compressive connection or the like. Moreover, the metal cap 11 has an outer periphery thereof which surrounds a cushion 8 which is arranged at an axial end of the insulating container 4, to surround an outer peripheral surface of the insulating tube 4 and, thereafter, which is secured to the outer peripheral surface of the insulating tube 4. A plurality of openings 4*a* are formed in a side surface of the insulating tube 4 on the side of the line-side terminal 1. Furthermore, as shown in FIG. 2 which is a bottom plan view, a plurality of openings 11*a* are formed also in an inclined portion of the metal cap 11. These openings 4*a* and 11*a* communicate with each other through a gap 14 between outer peripheral surfaces of the zinc oxide elements 5 and an inner peripheral surface of the insulating tube 4. Here, a distribution cross-sectional area of the openings 4*a* and 11*a* is made to the magnitude at least equal to or larger than the distribution cross-sectional area of the gap 14.

The lightning arrester having machinery built-in arranged in this manner is used as one for lightning surge overvoltage protection in the following manner. That it, the lightning arrester is arranged such that the ground mounting bracket 10 is positioned at one side of a suitable ground conductor 15 within a power distribution equipment such as a transformer tank 7, an air break switch or the like, the bolt 6 from the other side of the ground conductor 15 threadedly engages with the threaded part of the ground mounting bracket 10 whereby it is supported and fixed such that an axis of the lightning arrester is directed horizontally, and the line-side terminal 1 is connected to a transformer winding 13 or the like by a connecting conductor 12.

Accordingly, the surrounding of the lightning arrester having machinery built-in is filled with an insulating medium such as oil, SF6 gas, air, compressive gas, Kerr-phlorocarbon liquid or the like. The insulating medium is circulated between the openings 4*a* . . . the gap 14 . . . and the openings 11*a* to contribute to cooling of the zinc oxide elements 5. Thus, the insulating medium is useful for improvement of the surge absorption capacity of the lightning arrester having machinery built-in by the cooling effects. Particularly, the metal cap with the inclination portion 11 is connected to the ground mounting bracket 10, and the metal cap with the inclination portion 11 in the present embodiment is convex toward the anti-side of the zinc oxide elements 5. Accordingly, a sufficient distance L which is necessary for flowing-in of the insulating medium is secured between the lower end of the insulating tube 4 and the ground conductor 15 and, simultaneously, a space necessary for the insulating medium which flows in from the openings 11*a* formed in the inclined part of the metal cap 11 to reach the gap 14 can be secured at the end of the insulating tube 4. Accordingly, it is unnecessary to arrange the metal spacer 16 between the zinc oxide elements 5 and the ground-side terminal 17 as is in the prior art. Thus, it is possible to miniaturize the lightning arrester having machinery built-in in the axial direction of the insulating tube 4, or to obtain a sufficient storage volume by the insulating container 4 having the same axial length.

Figure 6:
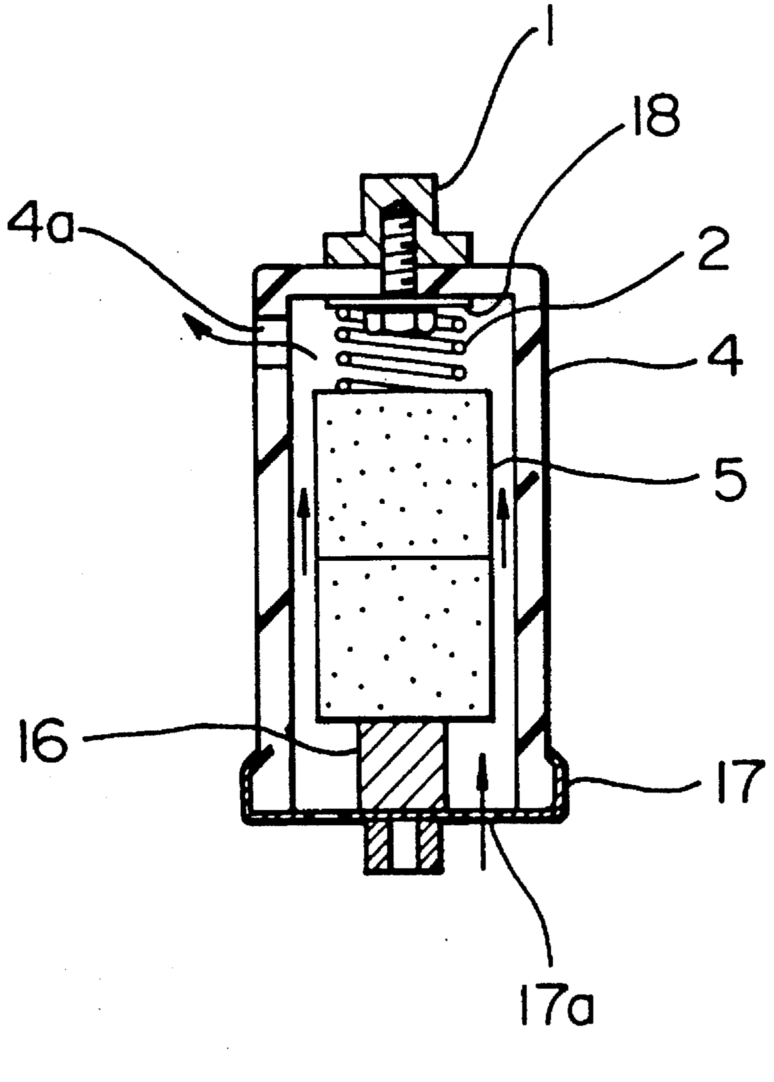
FIG. 6 PRIOR ART

Further, since the distribution cross-sectional area of the openings 4*a* and 11*a* in the present embodiment is formed to the magnitude at least equal to or greater than the distribution cross-sectional area of the gap 14, it is possible to utilize natural convection to easily form flow of the insulating medium at the outer peripheries of the zinc oxide elements 5, thereby cooling the zinc oxide elements 5. By such effects of suppression of a rise in temperature of the zinc oxide elements 5, it is possible that the zinc oxide elements 5 improve the lightning surge absorption capacity without thermally running away, and withstand running voltage so as to establish a long service-life characteristic. Thus, it is possible to considerably improve the reliability as the lightning arrester. Moreover, since the metal cap 11 has the inclined portion, it is possible to obtain resiliency to a some degree in the axial direction of the zinc oxide elements 5. Thus, even if the zinc oxide elements 5 expand and contract in the axial direction thereof by heat generation during running, it is possible to absorb the expansion and contraction by resilient deformation of the spring 2 and the metal cap 11. Thus, it is possible to prevent the secured part between the insulating tube 4 and the ground-side terminal 17 from being damaged as is in the prior-art example shown in FIG. 6.

Figure 3:
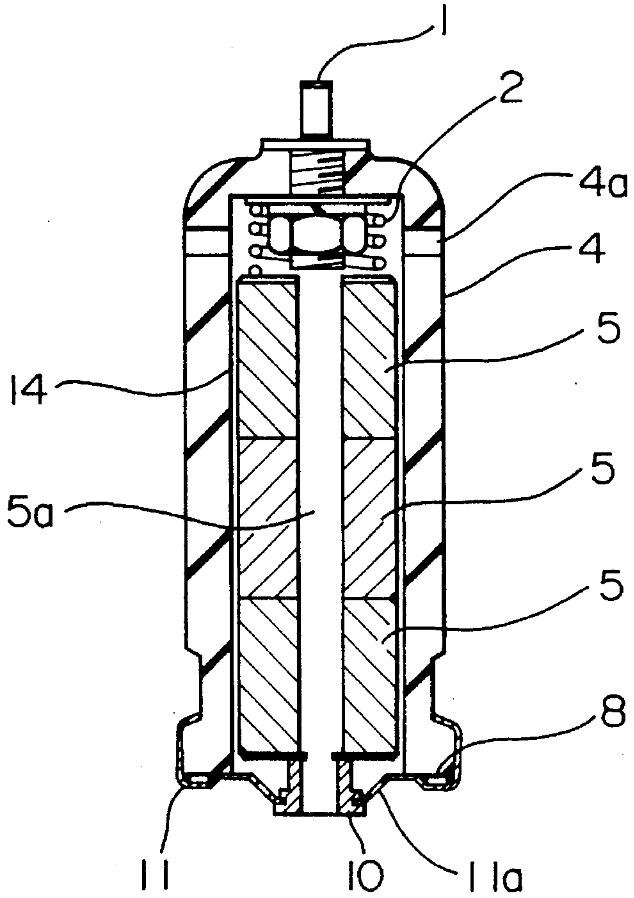
FIG. 3 is a transverse cross-sectional view of a lightning arrester having machinery built-in according to another embodiment of the present invention.

FIG. 3 is a transverse cross-sectional view of a lightning arrester having machinery built-in according to another embodiment of the present invention. A difference between the same and the embodiment shown in FIG. 1 resides in the arrangement of the zinc oxide elements 5. Only this different point will hereunder be described. The same reference numerals will be applied to equivalent parts, and the detailed description thereof will be omitted.

Figure 4:
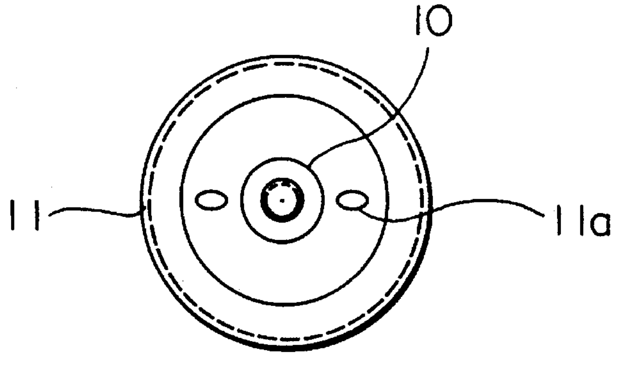
FIG. 4 is a bottom plan view of the lightning arrester having machinery built-in shown in FIG. 3.

The zinc oxide elements 5 are formed into a donut shape which has through bores 5*a* at centers thereof in the axial direction. A plurality of such zinc oxide elements 5 are laminated one upon the other, whereby a series of through bores 5*a* which communicate both the ends of the insulating tube 4 with each other are formed at the centers in the axial direction. One end of the series of through bores 5*a* opens to the outside of the insulating tube 4 through the openings 4*a*, and the other end of the series of through bores 5*a* communicates with the hollow part of the ground mounting bracket 10 as also shown in the bottom plan view in FIG. 4. Since the hollow part of the ground mounting bracket 10 is sealed by the bolt 6 under the mounted state in FIG. 1, it is preferable that bores (not shown) are formed in the hollow part of the ground mounting bracket 10, and a space defined between the zinc oxide elements 5 and the metal cap 11 communicates with the series of through bores 5*a* by the not shown bores. Furthermore, it is also possible that a through bore is formed at a center of the bolt 6 shown in FIG. 1, and the insulating medium flows in from the through bore through the bolt 6.

According to the lightning arrester having machinery built-in of the above-described embodiment, a flow of the insulating medium which passes through the series of through bores 5*a* is added so that the cooling effects of the zinc oxide elements 5 due to the insulating medium increase. Since the arrangement relating to the metal cap with the inclination portion 11 is the same as that of the previous embodiment, it is possible to obtain substantially similar advantages.

Figure 5:
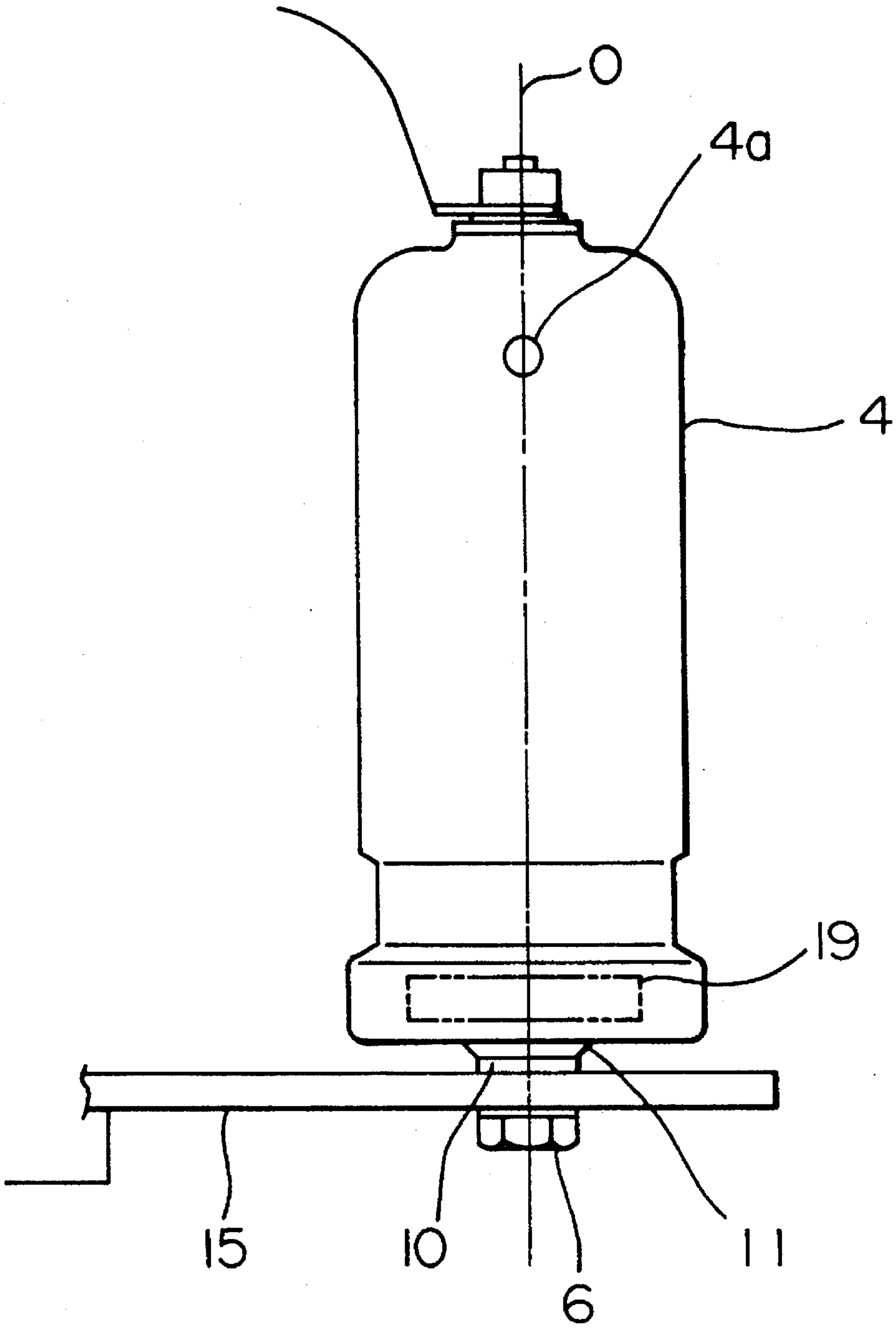
FIG. 5 is a plan view of the lightning arrester having machinery built-in shown in FIG. 1.

FIG. 5 is a plan view of the lightning arrester having machinery built-in which is arranged as described above.

Particularly, attention is paid to the metal cap with the inclination portion 11 which surrounds the insulating tube 4 up to the outer peripheral surface of the lower end of the insulating tube 4 in the figure and which is secured. Then, marking of at least either one of the serial number of the lightning arrester having machinery built-in and a production lot number 19 of the zinc oxide elements is applied to the outer surface thereof which surrounds the outer peripheral surface of the insulating tube 4. Accordingly, if the lightning arrester having machinery built-in is assembled as shown in FIG. 1 with this serial number or the production lot number 19 of the zinc oxide elements being faced upwardly, it is made possible to easily judge the assembled state of the lightning arrester having machinery built-in from the upper part of the power distribution equipment upon inspection while the lightning arrester having machinery built-in is under the assembled state. Thus, maintenance and inspection are made easy. In this connection, it is preferable that the aforesaid number 19 is provided at a location at which the openings 4*a* which are formed in the insulating tube 4 on the side of the line-side terminal 1 and a single planar surface which passes through an axis O̲ of the insulating tube 4 cross the outer surface of the insulating tube. Thus, the number 19 and the openings 4*a* are coincident in direction with each other. If the number 19 is mounted on the ground bracket 15 so as to be directed just thereabove, the insulating medium which flows into the insulating tube 4 by convection is made easy to flow out to the outside, and a flow within the insulating tube is promoted. Thus, it is possible to easily mount the lightning arrester in such a direction that an attempt can be made to improve the cooling efficiency.

EFFECT OF THE INVENTION

As described above, according to the lightning arrester having machinery built-in of the present invention, the metal cap with the inclination portion which projects toward the anti-side of the zinc oxide elements is provided on the one end of the insulating tube, and the openings which communicate the inside and the outside of the insulating tube with each other are formed in the inclination portion of the metal cap. Accordingly, it is possible to provide a small-sized lightning arrester having machinery built-in which uses the insulating tube which is small-sized in the axial direction. Further, since the openings are provided in the inclination portion, a deflection angle of the flow of the insulating medium which is introduced from the openings is reduced, and the insulating medium is introduced into the insulating tube more efficiently. Thus, it is possible to effectively cool the internal zinc oxide elements to improve the lightning surge absorption capacity of the zinc oxide elements, so that an attempt can be made to improve the service-life characteristic.

What is claimed is:

1. A lightning arrester having machinery built-in in which a line-side terminal is provided on an axial one end of an insulating tube which stores therein zinc oxide elements, a ground mounting bracket is fixed to the axial other end of said insulating tube, openings which communicate with each other through a gap between outer peripheries of said zinc oxide elements and an inner wall surface of said insulating tube are formed respectively on the side of said line-side terminal and on the side of said ground mounting bracket, and said ground mounting bracket is fixed to a ground bracket within a power distribution equipment which is filled with an insulating medium, characterized in that a metal cap with an inclination portion which projects toward the anti-side of the zinc oxide elements and in which said ground mounting bracket is fixed substantially at a center thereof is provided at said axial other end of said insulating tube, and said openings on the side of said ground mounting bracket are formed in said metal cap.

2. A lightning arrester having machinery built-in according to claim 1, characterized in that said openings on the side of said ground mounting bracket are formed in the inclined portion of said metal cap.

3. A lightning arrester having machinery built-in according to claim 1, characterized in that said ground mounting bracket is provided in contact with said axial other end of said zinc oxide elements, and is fixed to said metal cap at an outer periphery of the middle of said ground mounting bracket in an axial direction thereof.

4. A lightning arrester having machinery built-in according to claim 1, characterized in that said openings which are formed respectively on the side of said line-side terminal of said insulating tube and on the side of said ground mounting bracket are respectively larger than a distribution area of said gap between outer peripheries of said zinc oxide elements and the inner wall surface of said insulating tube.

5. A lightning arrester having machinery built-in according to claim 1, characterized in that said metal cap is so provided as to surround the insulating tube up to an outer peripheral surface of said axial other end of said insulating tube, and marking of a predetermined number is applied to a portion which surrounds the outer peripheral surface so that the predetermined number is displayed.

6. A lightning arrester having machinery built-in according to claim 5, characterized in that said marking and displaying are formed at a position which includes a location at which a single planar surface which passes through one of the openings which are formed on the side of the line-side terminal of said insulating tube and an axis of the insulating tube crosses said outer peripheral surface.

* * * * *